(12) United States Patent
Asada et al.

(10) Patent No.: US 6,241,066 B1
(45) Date of Patent: Jun. 5, 2001

(54) WORKING VEHICLE

(75) Inventors: Akihiro Asada, Kawachinagano; Hironobu Kubota, Gojo, both of (JP)

(73) Assignee: Kubota Corporation (JP)

( * ) Notice: Subject to any disclaimer, the term of this patent is extended or adjusted under 35 U.S.C. 154(b) by 0 days.

(21) Appl. No.: 09/365,302

(22) Filed: Jul. 30, 1999

(30) Foreign Application Priority Data

Aug. 3, 1998 (JP) .................................................. 10-218900
Aug. 19, 1998 (JP) .................................................. 10-232733

(51) Int. Cl.[7] .......................... B60K 41/22; F16D 67/00
(52) U.S. Cl. .......................... 192/3.63; 74/325; 74/335; 192/3.51
(58) Field of Search .......................... 74/325, 335, 331; 180/242, 245, 246, 248; 192/3.63, 3.58, 3.57

(56) References Cited

U.S. PATENT DOCUMENTS 5,429,005 * 7/1995 Fukui et al. .......................... 74/325
5,651,289 * 7/1997 Asada et al. .......................... 74/335

* cited by examiner

*Primary Examiner*—Rodney H. Bonck
*Assistant Examiner*—Tisha D. Lewis
(74) *Attorney, Agent, or Firm*—Webb Ziesenheim Logsdon Orkin & Hanson, P.C.

(57) ABSTRACT

During a shifting operation to slide a shift gear of an auxiliary change speed device, clutches of a backward and forward drive switching device acting also as a propelling clutch and of a main change speed device are automatically disengaged to place these devices in neutral state. After the shift gear is switched to a high-speed position or low-speed position, the clutches of the main change speed device are automatically engaged to return the main change speed device to a transmitting state. After the main change speed device returns to the transmitting state, the clutches of the backward and forward drive switching device are automatically engaged to return the backward and forward drive switching device to a transmitting state.

20 Claims, 13 Drawing Sheets

Fig.5

| | | 1st | 2nd | 3rd | 4th | 5th | 6th | 7th | 8th |
|---|---|---|---|---|---|---|---|---|---|
| First main speed change device (20a) | 1st speed clutch (21) | ON | – | – | – | – | – | – | – |
| | 2nd speed clutch (22) | – | ON | – | – | – | ON | – | – |
| | 3rd speed clutch (23) | – | – | ON | – | – | – | ON | – |
| | 4th speed clutch (24) | – | – | – | ON | – | – | – | ON |
| 2nd main speed change device (20b) | low speed clutch (25) | ON | ON | ON | ON | – | – | – | – |
| | high speed clutch (26) | – | – | – | – | ON | ON | ON | ON |

WORKING VEHICLE

BACKGROUND OF THE INVENTION

1. Field of the Invention

This invention relates to a working vehicle having a propelling clutch, a main change speed device and an auxiliary change speed device. More particularly, the invention relates to a shift control apparatus of this type of working vehicle.

2. Description of the Related Art

In a conventional working vehicle, when the auxiliary change speed device is shifted, the propelling clutch is operated automatically in an interlocked relationship thereto. Thus, an auxiliary change speed operation may be effected without requiring an additional operation to break power transmission from the engine to the auxiliary change speed device. However, in the conventional working vehicle, when the shift gear of the auxiliary change speed device is switched from a non-transmitting position to a transmitting position, the traveling device such as wheels is connected to the main change speed device through the auxiliary change speed device. After a shifting operation of the auxiliary change speed device is completed and before the propelling clutch is engaged, the main change speed device is in a state of transmitting power at a certain speed and has a relatively strong inertia to remain in that state. As a result, when the traveling device is connected to the main change speed device after the auxiliary change speed operation, the main change speed device imparts a resistance to the traveling device in inertial motion, which tends to produce a shock of change speed.

SUMMARY OF THE INVENTION

The object of this invention is to provide a structure for shifting a propelling transmission which allows a change speed operation to be carried out while minimizing a shock of change speed, and without requiring additional operations to break and restore transmission of engine output.

The above object is fulfilled, according to this invention, by a working vehicle comprising an engine, a propelling clutch driven by said engine, a first change speed unit driven by said propelling clutch and shiftable to a plurality of speed stages and to neutral by switching of a plurality of change speed clutches, a second change speed unit driven by said first change speed unit and shiftable between a transmitting position and a neutral position, traveling means driven by drive transmitted from said second change speed unit. The working vehicle further has associating means for automatically switching said propelling clutch and said change speed clutches in response to a shifting operation of one of said first and second change speed units such that, when said one of said first and second change speed units is shifted, said propelling clutch is disengaged and the other of said first and second change speed units is switched to neutral, and when said one of said first and second change speed units is switched to a transmitting state, said propelling clutch is engaged and the other of said first and second change speed unit is returned to a transmitting state. The associating means is operable to return said other of said first and second change speed units to the transmitting state, and then to engage said propelling clutch.

We now take an example where the main change speed device is a first change speed unit and auxiliary change speed device is a second change speed unit for the sake of simplicity.

With the above construction, when shifting the auxiliary change speed device (the second change speed unit), for example, the associating means operates automatically to disengage the propelling clutch and place the main change speed device (the first change speed unit) in neutral, thereby stopping power transmission from the engine to the auxiliary change speed device. Subsequently, the propelling clutch is automatically engaged, and the main change speed device is automatically returned to the transmitting state, to transmit engine output to the auxiliary change speed device.

In the returning operation, the main change speed device is first returned to the transmitting state, and then the propelling clutch is engaged. That is, the main change speed device is in neutral when the traveling device is connected to the main change speed device with the auxiliary change speed device switched to a transmitting state. Thus, the connection is made in such a way that the main change speed device imparts a less resistance to inertial movement of the traveling device than in the prior art. When the propelling clutch returns to an engaged state, the main change speed device has already returned to the transmitting state. Thus, the traveling device and main change speed device have dynamic inertia. A component of the propelling clutch interlocked to the main change speed device is connected to a component thereof interlocked to the engine in a way to produce little or no shock.

Thus, in time of an auxiliary change speed operation, the associating means automatically disengages the propelling clutch and main change speed device. The change speed operation may be performed in a simple way without requiring additional operations to break and restore transmission of the engine output to the auxiliary change speed device. Moreover, the traveling device returns to the driving state after the change speed operation, with the main change speed device hardly imparting resistance to the movement of the traveling device, and with the propelling clutch subjected to little or no shock. Consequently, the working vehicle may run smoothly and easily with little shock resulting from change speed operations.

The present invention is not limited to the above situation but can also be applied to the situation where, for example, the main change speed device (the first change speed unit) is shifted to a different speed position in which case, the propelling clutch and the auxiliary change speed device (the second change speed unit) is automatically switched to neutral by the associating means.

BRIEF DESCRIPTION OF THE DRAWINGS

FIG. 5 is an explanatory view of speed stages of a main change speed device;

DETAILED DESCRIPTION OF THE PREFERRED EMBODIMENTS

An agricultural tractor which is one example of working vehicles according to this invention will be described hereinafter with reference to the accompanying drawings.

Figure 1:
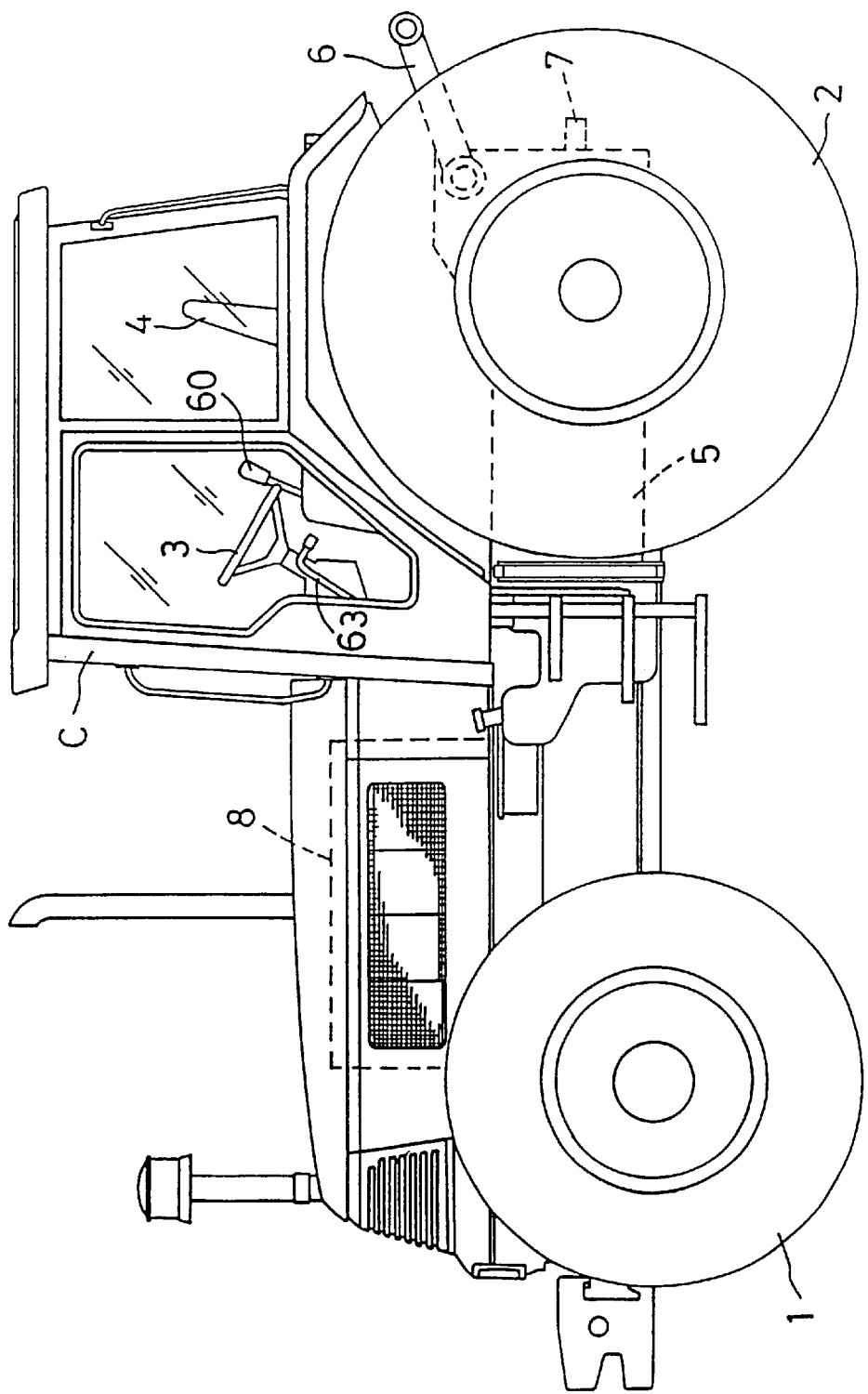
FIG. 1 is a side elevation of an agricultural tractor having a shift control apparatus according to this invention.

As shown in FIG. 1, the agricultural tractor includes a self-propelled vehicle body with a pair of right and left front drive wheels 1 and a pair of right and left rear drive wheels 2. A driving platform is formed on the vehicle body, which includes a steering wheel 3 for steering the front wheels 1, a driver's seat 4 and a driving cab C. A transmission case 5 forms a rear portion of the vehicle body, and includes lift arms 6 for vertically movably coupling a varied working implement such as a rotary plow, and a power takeoff shaft 7 for transmitting power to the working implement.

An engine 8 is mounted in a motor section disposed in a forward position of the vehicle body. Torque output of the engine is transmitted to the front wheels 1 and rear wheels 2 constituting a traveling device through a propelling transmission constructed as shown in FIG. 2.

The torque output of the engine 8 is inputted to the transmission case 5 and transmitted to a backward and forward drive switching device 10 having two clutches 11 and 12. Torque output of the backward and forward drive switching device 10 is transmitted to a main change speed device 20 having six clutches 21–26. Torque output of the main change speed device 20 is transmitted to an auxiliary change speed device 30 having one shift gear 30a. Torque output of the auxiliary change speed device 30 is transmitted to a differential mechanism 2a for driving the right and left rear wheels 2. The torque output of the auxiliary change speed device 30 is transmitted also to a front wheel change speed device 33 through rotary shafts 32. Torque output of the front wheel change speed device 33 is transmitted through a rotary shaft 34 to a differential mechanism 1a for driving the right and left front wheels 1.

Figure 2:
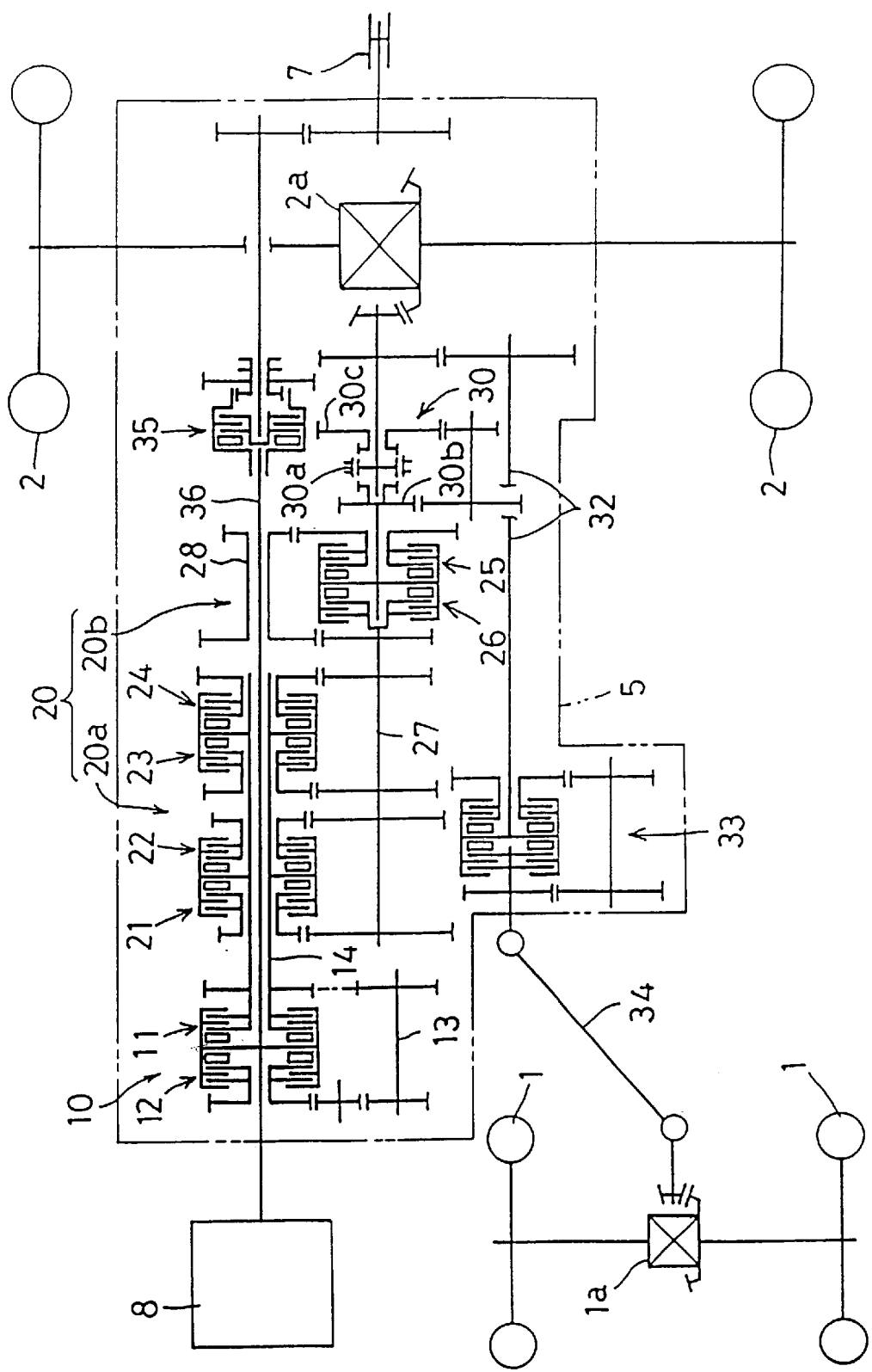
FIG. 2 is a schematic view of a propelling transmission.

FIG. 2 shows also an implement driving clutch 35 for receiving power of engine 8 through a rotary shaft 36 mounted in a tubular rotary shaft 14, and transmitting the power to the power takeoff shaft 7.

The backward and forward drive switching device 10 includes the two clutches 11 and 12, and a backward drive transmission shaft 13 interlocked through gears to an output end of one of these clutches 12. The two clutches 11 and 12 are operable to provide a state of forward drive transmission, a state of backward drive transmission and a neutral state. Specifically, both clutches 11 and 12 are hydraulic clutches for operating wet type multidisk friction clutch mechanisms with hydraulic pistons 11a and 12a disposed in clutch bodies, respectively. The state of forward drive transmission is provided when pressure oil is supplied to the hydraulic piston 11a of one of the clutches, which is a forward drive clutch 11, to engage this forward drive clutch 11, and a pressure oil supply to the hydraulic piston 12a of the other, backward drive clutch 12 is stopped to disengage the backward drive clutch 12. Then, the torque of engine 8 is transmitted from the forward drive clutch 11 to the tubular rotary shaft 14 acting as an output shaft of backward and forward drive switching device 10 and an input shaft of main change speed device 20. The state of backward drive transmission is provided when the pressure oil supply to the hydraulic piston 11a of forward drive clutch 11 is stopped to disengage the forward drive clutch 11, and pressure oil is supplied to the hydraulic piston 12a of backward drive clutch 12 to engage the backward drive clutch 12. Then, the torque of engine 8 is transmitted from the backward drive clutch 12 to the tubular rotary shaft 14 through the backward drive transmission shaft 13.

The neutral state is provided when both the forward drive clutch 11 and backward drive clutch 12 are disengaged, to stop the power transmission to the tubular rotary shaft 14. Thus, the backward and forward drive switching device 10 acts as a propelling clutch for making and breaking transmission of the torque from the engine 8 to the main change speed device 20 and auxiliary change speed device 30.

The main change speed device 20 includes a first main change speed device 20a and a second main change speed device 22b. The first main change speed device 20a has four clutches 21–24 among the six change speed clutches 21–26, and the tubular rotary shaft 14 acting as the input shaft. The second main change speed device 20b has the other two clutches 25 and 26 among the six clutches 21–26. An output shaft 27 of the first main change speed device 20a acts as an input shaft of the second main change speed device 20b. Thus, the second main change speed device 20b is connected in series to the first main change speed device 20a.

The clutches 21–26 are operable to provide eight, a first to an eighth, speed stages as shown in FIG. 5. In FIG. 5, "ON" denotes engagement of the clutches 21–26, while "–" denotes disengagement of the clutches 21–26.

That is, the six clutches 21–26 are all hydraulic clutches for operating wet type multi-disk friction clutch mechanisms with hydraulic pistons 21a–26a disposed in dutch bodies, respectively. The first speed is provided when pressure oil is supplied to the hydraulic piston 21a of the first speed clutch 21 among the four clutches 21–24 of the first main change speed device 20a, to engage the first speed clutch 21, and pressure oil is supplied to the hydraulic piston 25a of one of the two clutches 25, which is a low-speed clutch, of the second main change speed device 20b, to engage the low-speed clutch 25. Then, the torque of backward and forward drive switching device 10 is transmitted to the auxiliary change speed device 30 through the first speed clutch 21, output shaft 27, a transmission gear 28 relatively rotatably mounted on the rotary shaft 36, and the low-speed clutch 25. The second speed is provided when pressure oil is supplied to the hydraulic piston 22a of the second speed clutch 22 among the four clutches 21–24 of the first main change speed device 20a, to engage the second speed clutch 22, and the low-speed clutch 25 of the second main change speed device 20b is engaged. Then, the torque of backward and forward drive switching device 10 is transmitted to the auxiliary change speed device 30 through the second speed clutch 22, output shaft 27, transmission gear 28 and low-speed clutch 25. The third speed is provided when pressure oil is supplied to the hydraulic piston 23a of the third speed clutch 23 among the four clutches 21–24 of the first main change speed device 20a, to engage the third speed clutch 23, and the low-speed clutch 25 of the second main change speed device 20b is engaged. Then, the torque of backward and forward drive switching device 10 is transmitted to the auxiliary change speed device 30 through the third speed clutch 23, output shaft 27, transmission gear 28 and low-speed clutch 25. The fourth speed is provided when pressure oil is supplied to the hydraulic piston 24a of the fourth speed clutch 24 among the four clutches 21–24 of the first main change speed device 20a, to engage the fourth speed clutch 24, and the low-speed clutch 25 of the second main change speed device 20b is engaged. Then, the torque of backward and forward drive switching device 10 is transmitted to the auxiliary change speed device 30 through the fourth speed clutch 24, output shaft 27, transmission gear 28 and low-speed clutch 25. The fifth speed is provided when the first speed clutch 21 of the first main change speed device 20a is engaged, and pressure oil is supplied to the hydraulic piston 26a of the other clutch 26, which is a high-speed clutch, of the second main change speed device 20b, to engage the high-speed clutch 26. Then, the torque of backward and forward drive switching device 10 is transmitted to the auxiliary change speed device 30 through the first speed clutch 21, output shaft 27 and high-speed clutch 26. The sixth speed is provided when the second speed clutch 22 of the first main change speed device 20a is engaged, and the high-speed clutch 26 of the second main change speed device 20b is engaged. Then, the torque of backward and forward drive switching device 10 is transmitted to the auxiliary change speed device 30 through the second speed clutch 22, output shaft 27 and high-speed clutch 25. The seventh speed is provided when the third speed clutch 23 of the first main change speed device 20a is engaged, and the high-speed clutch 26 of the second main change speed device 20b is engaged. Then, the torque of backward and forward drive switching device 10 is transmitted to the auxiliary change speed device 30 through the third speed clutch 23, output shaft 27 and high-speed clutch 26. The eighth speed is provided when the fourth speed clutch 24 of the first main change speed device 20a is engaged, and the high-speed clutch 26 of the second main change speed device 20b is engaged. Then, the torque of backward and forward drive switching device 10 is transmitted to the auxiliary change speed device 30 through the fourth speed clutch 24, output shaft 27 and high-speed clutch 26.

When all of the first to fourth speed clutches 21–24 are disengaged, the first main change speed device 20a assumes a neutral state for stopping power transmission to the second main change speed device 20b. When both of the low-speed clutch 25 and high-speed clutch 26 are disengaged, the second main change speed device 20b assumes a neutral state for stopping power transmission to the auxiliary change speed device 30. When all of the first to fourth speed clutches 21–24 and the low-speed clutch 25 and high-speed clutch 26 are disengaged, the main change speed device 20 assumes a neutral state for disconnecting the backward and forward drive switching device 10 and auxiliary change speed device 30.

Figure 4:
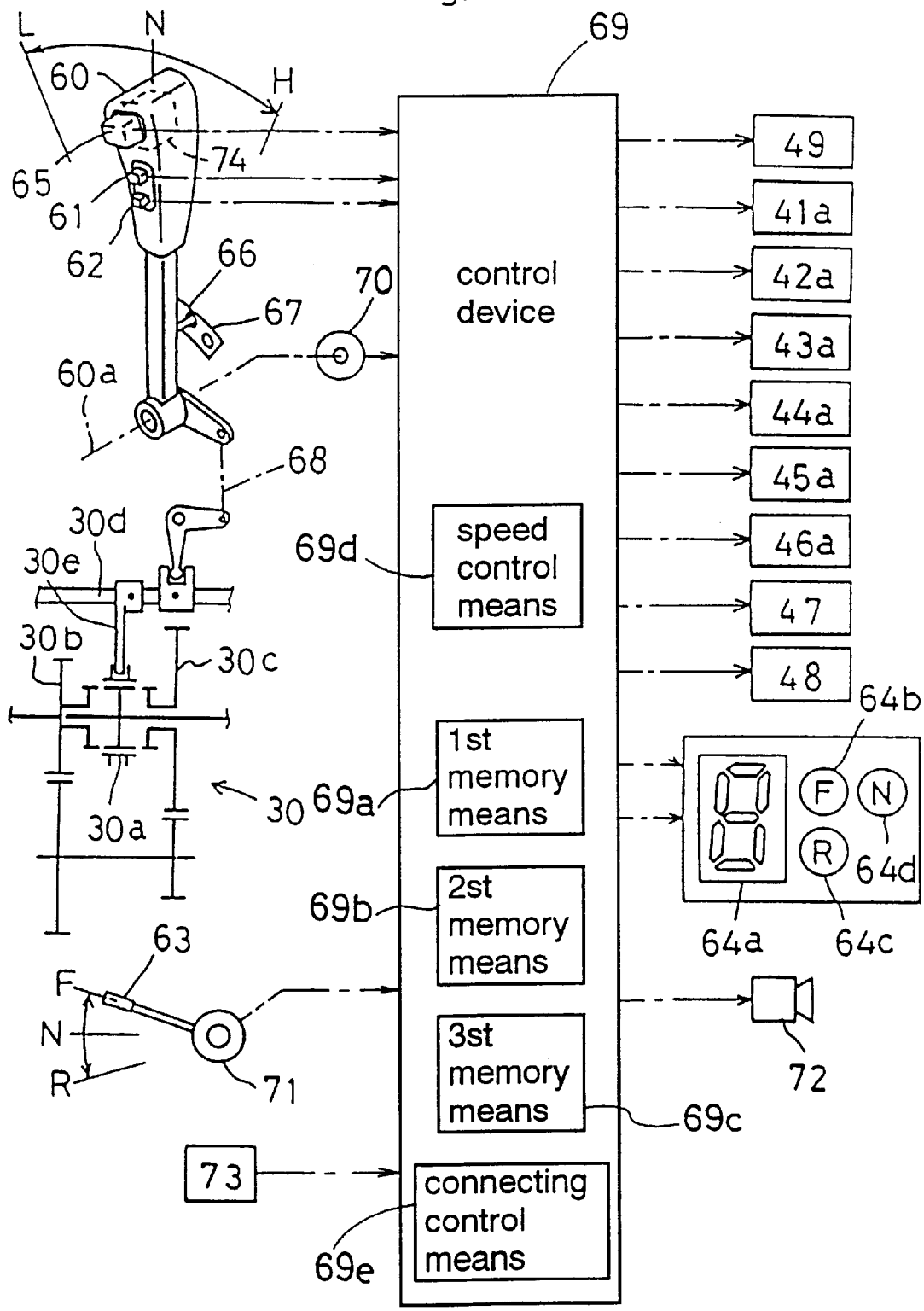
FIG. 4 is a block diagram of the shift control apparatus.

As shown in FIGS. 2 and 4, the auxiliary change speed device 30 is connected in series to the second main change speed device 20b, with an input gear 30b rotatable with an output shaft of the second main change speed device 20b. The auxiliary change speed device 30 provides two, high and low, speeds, with the shift gear 30a slidable to engage selectively the input gear 30b and a gear 30c relatively rotatably mounted on the output shaft.

Figure 3:
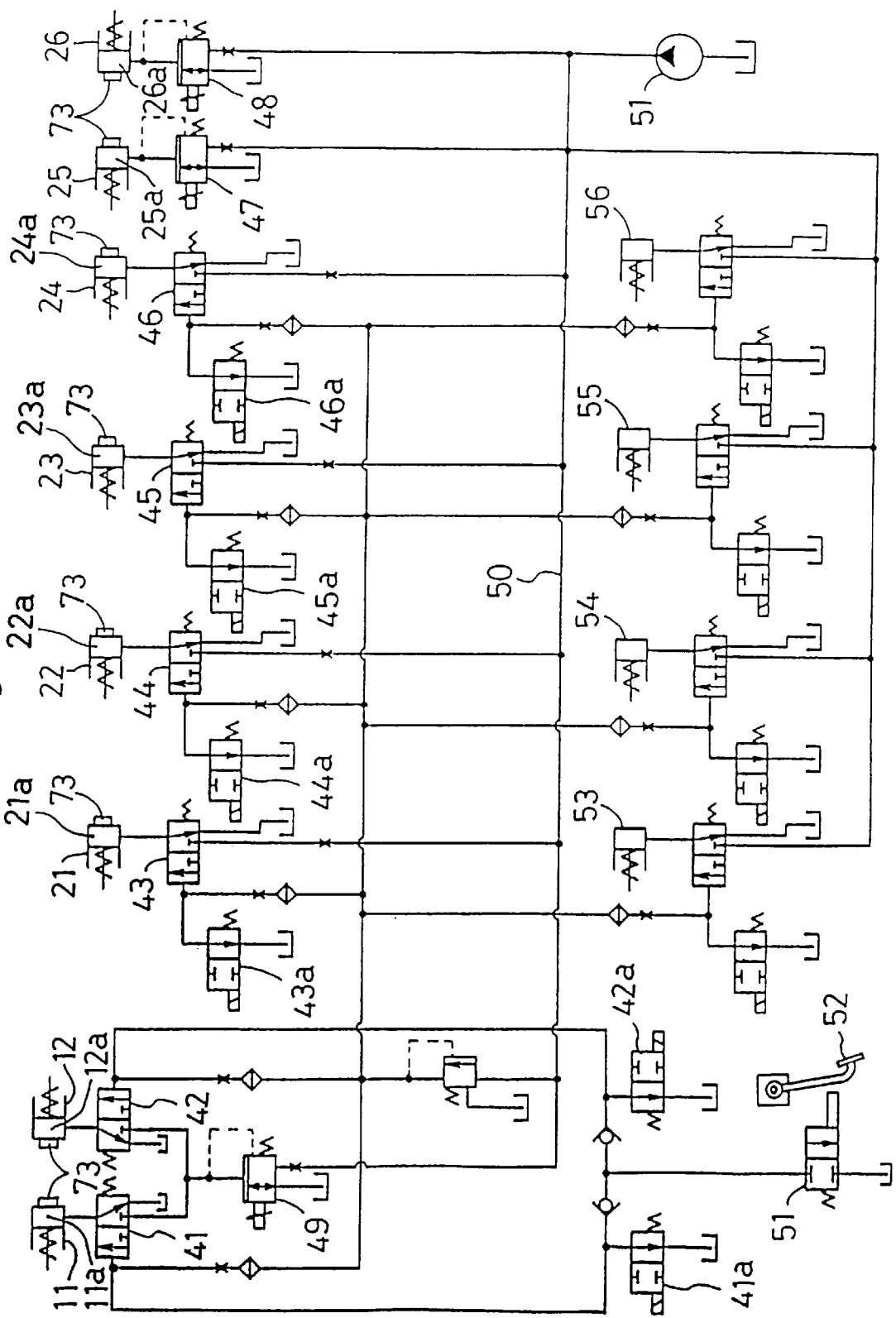
FIG. 3 is a schematic view of a shift controlling hydraulic circuit.

The clutches 11, 12 and 21–26 are controlled by a hydraulic circuit constructed as shown in FIG. 3.

The hydraulic circuit includes a control valve 41 for controlling the forward drive clutch 11, a control valve 42 for controlling the backward drive clutch 12, a control valve 43 for controlling the first speed clutch 21, a control valve 44 for controlling the second speed clutch 22, a control valve 45 for controlling the third speed clutch 23, a control valve 46 for controlling the fourth speed clutch 24, an electromagnetic control valve 47 for controlling the low-speed clutch 25, and an electromagnetic control valve 48 for controlling the high-speed clutch 26. These control valves are connected to one hydraulic pump 51 through an oil supply line 50. The supply line 50 includes an electromagnetic proportional control valve 49 for sequentially supplying pressure oil to the control valves 41 and 42 of the forward drive clutch 11 and backward drive clutch 12 for sequentially applying a transmitting clutch pressure to the forward drive clutch 11 and backward drive clutch 12.

The control valve 41 of the forward drive clutch 11 has an electromagnetic control valve 41a connected to an operating portion thereof through a pilot line. The control valve 42 of the backward drive clutch 12 has an electromagnetic control valve 42a connected to an operating portion thereof through a pilot line. Each of the electromagnetic control valves 41a and 42a is spring-loaded to a drain position. When a control electric current is applied to switch the electromagnetic control valve 41a to a supply position, a pilot hydraulic pressure switches the control valve 41 to a supply position against a self-restoring force acting toward a drain position, to engage the forward drive clutch 11. When a control electric current is applied to switch the electromagnetic control valve 42a to a supply position, a pilot hydraulic pressure switches the control valve 42 to a supply position against a self-restoring force acting toward a drain position, to engage the backward drive clutch 12. When both the electromagnetic control valves 41a and 42a are operated to the drain positions, the control valves 41 and 42 are moved to the drain positions to disengage the forward drive clutch 11 and backward drive clutch 12, respectively, whereby the backward and forward drive switching device 10 becomes neutral.

The control valve 43 of the first speed clutch 21 has an electromagnetic control valve 43a connected to an operating portion thereof through a pilot line. The control valve 44 of the second speed clutch 22 has an electromagnetic control valve 44a connected to an operating portion thereof through a pilot line. The control valve 45 of the third speed clutch 23 has an electromagnetic control valve 45a connected to an operating portion thereof through a pilot line. The control valve 46 of the fourth speed clutch 24 has an electromagnetic control valve 46a connected to an operating portion thereof through a pilot line. Each of the electromagnetic control valves 43a–46a is spring-loaded to a drain position. When a control electric current is applied to switch the electromagnetic control valve 43a to a supply position, a pilot hydraulic pressure switches the control valve 43 to a supply position against a self-restoring force acting toward a drain position, to engage the first speed clutch 21. When a control electric current is applied to switch the electromagnetic control valve 44a to a supply position, a pilot hydraulic pressure switches the control valve 44 to a supply position against a self-restoring force acting toward a drain position, to engage the second speed clutch 22. When a control electric current is applied to switch the electromagnetic control valve 45a to a supply position, a pilot hydraulic pressure switches the control valve 45 to a supply position against a self-restoring force acting toward a drain position, to engage the third speed clutch 23. When a control electric current is applied to switch the electromagnetic control valve 46a to a supply position, a pilot hydraulic pressure switches the control valve 46 to a supply position against a self-restoring force acting toward a drain position, to engage the fourth speed clutch 24.

A switch valve 51 is connected to the pilot lines for the forward drive clutch 11 and backward drive clutch 12. This switch valve 51 is operable by a clutch pedal 52 disposed on the driving platform, to disengage the forward drive clutch 11 and backward drive clutch 12 by overriding the electromagnetic control valves 41a and 42a or to allow the electromagnetic control valves 41a and 42a to control the forward drive clutch 11 and backward drive clutch 12. That is, the clutch pedal 52 enables an operation to place the backward and forward drive switching device 10 in neutral. Of the hydraulic clutches 53–56 shown in FIG. 3, the clutch 53 is operable to switch the front differential mechanism 1a between a locked state and an unlocked state. The clutch 54 is a operable to switch the rear differential mechanism 2a between a locked state and an unlocked state. The clutches 55 and 56 are operable to switch the front wheel change speed device 33 between a standard state and an accelerating state. That is, when the clutch 55 is engaged, the front wheel change speed device 33 is placed in the standard state to drive the right and left front wheels 1 at approximately the same average peripheral speed as the right and left rear wheels 2. When the clutch 56 is engaged, the front wheel change speed device 33 is placed in the accelerating state to drive the right and left front wheels 1 at approximately twice an average peripheral speed of the right and left rear wheels 2.

The electromagnetic control valves 41a–46a, 47 and 48, electromagnetic proportional control valve 49 and shift gear 30a are operable by a shift control apparatus to change traveling speed. As shown in FIG. 4, the shift control apparatus includes an auxiliary shift lever 60 disposed at one side of the driver's seat 4 on the driving platform, a shift-up switch 61, a shift-down switch 62 and an auxiliary change speed detection switch 74 arranged laterally of a grip unit of the auxiliary shift lever 60, a backward and forward lever 63 disposed adjacent the steering wheel 3 on the driving platform, and a display 64 disposed on a control panel on the driving platform. The shift control apparatus will be described in detail hereinafter.

As shown in FIG. 4, the auxiliary shift lever 60 is supported by the self-propelled vehicle body to be rockable longitudinally of the vehicle body about an axis 60a of a mounting boss. The auxiliary shift lever 60 may be rocked after pressing an unlock button 65 disposed laterally of the grip of auxiliary shift lever 60 to release a lock pin 66 projecting between the grip and mounting boss of auxiliary shift lever 60, from a positioning piece 67 fixed to the vehicle body. The auxiliary shift lever 60 has an arm extending from the mounting boss to be pivotable therewith. This arm is interlocked to a shift fork support shaft 30d of auxiliary change speed device 30 through a mechanical linkage 68 including a rod and a pivot link. Consequently, when the auxiliary shift lever 60 is rocked about the axis 60a, its operating force slides the shift fork support shaft 30d. A shift fork 30e supported by the shift fork support shaft 30d to be slidable therewith slides the shift gear 30a and switches the shift gear 30a among a high-speed position for engaging the input gear 30b, a low-speed position for engaging the gear 30c, and a neutral position disengaged from the gears 30b and 30c.

The auxiliary change speed detection switch 74 is turned on when the unlock button 65 is pressed. That is, to shift the auxiliary change speed device 30, the unlock button 65 is pressed to render the auxiliary shift lever 60 operable. Upon detection of the pressing of the unlock button 65, the detection switch 74 regards a shifting operation of auxiliary change speed device 30 as being performed, and outputs the detection result as an electric signal to a controller 69.

A rotating portion of a potentiometer 70 is interlocked to the mounting boss of auxiliary shift lever 60. The potentiometer 70 detects the auxiliary shift lever 60 operated to a high-speed position H, neutral position N or low-speed position L, and outputs a detection result as an electric signal to the controller 69.

The shift-up switch 61 and shift-down switch 62 are linked to the controller 69. The shift-up switch 61, each time its button is pressed, outputs an instruction for one shift-up operation as an electric signal to the controller 69. The shift-down switch 62, each time its button is pressed, outputs an instruction for one shift-down operation as an electric signal to the controller 69.

A backward and forward drive detection switch 71 acts on a proximal end of the backward and forward lever 63. The backward and forward drive detection switch 71 detects the backward and forward lever 63 operated to a forward position F, neutral position N or backward position R, and outputs a detection result as an electric signal to the controller 69.

The display 64 includes a shift indicator 64a, a forward drive lamp 64b, a backward drive lamp 64c and a neutral lamp 64d. The shift indicator 64a displays an Arabic numeral corresponding to one of the first to eighth speeds being provided by the main change speed device 20. When, for example, the main change speed device 20 provides the eighth speed, numeral "8" is lit for display. That is, numerals are used as one example of indices for indicating which of the first to eighth speeds is currently provided by the main change speed device 20. The forward drive lamp 64b is lit when the backward and forward drive switching device 10 is in the forward drive position. The backward drive lamp 64c is lit when the backward and forward drive switching device 10 is placed in the backward drive position. The neutral lamp 64d is lit when the backward and forward drive switching device 10 is in neutral.

The controller 69 comprises a microcomputer having linked thereto pressure sensors 73, the display 64 and a buzzer 72. The pressure sensors 73 are provided for the electromagnetic control valves 41a–46a, electromagnetic control valves 47 and 48, electromagnetic proportional control valve 49 and clutches 11, 12 and 21–26, respectively, to detect pressures and determine operating states of these components. The controller 69 is operable as set out hereunder based on information from the shift-up switch 61, shift-down switch 62, auxiliary change speed detection switch 74, potentiometer 70 and backward and forward drive detection switch 71 as well as programs.

When the backward and forward lever 63 is operated to the forward position F, the controller 69 applies a control current to the electromagnetic control valve 41a for switching the backward and forward drive switching device 10 to the forward drive state, and lights the forward drive lamp 64b on the display 64. When the backward and forward lever 63 is operated to the backward position R, the controller 69 applies a control current to the electromagnetic control valve 42a for switching the backward and forward drive switching device 10 to the backward drive state, lights the backward drive lamp 64c on the display 64, and intermittently drives the buzzer 63 to sound a warning. When the backward and forward lever 63 is operated to the neutral position, the controller 69 stops the control current to the electromagnetic control valve 41a or 42a, switches the backward and forward drive switching device 10 to neutral, and lights the neutral lamp 64d on the display 64.

When, the shift-up switch 61 or shift-down switch 62 is operated, with the backward and forward lever 63 set to the forward position F or backward position R, a shift control device 69d in the form of a shift control program for the controller 69 shifts the main change speed device 20. That is, when the shift-up switch 61 is pressed, the shift control device 69d sets a target speed based on a shift-up instruction from the switch 61 and a speed currently provided by the main change speed device 20, and operates the control valves 43a–46a of clutches 21–26 and the control valves 46 and 47 to switch the main change speed device 20 for providing the target speed one stage higher than the current speed. When the shift-down switch 62 is pressed, the shift control device 69d sets a target speed based on a shift-down instruction from the switch 62 and a speed currently provided by the main change speed device 20, and operates the control valves 43a–46a of clutches 21–26 and the control valves 46 and 47 to switch the main change speed device 20 for providing the target speed one stage lower than the current speed. Once the main change speed device 20 is switched to provide a target speed, the shift control device 69d causes the shift indicator 64a on the display 64 to show an Arabic numeral corresponding to the new speed provided by the main change speed device 20.

Figure 6:
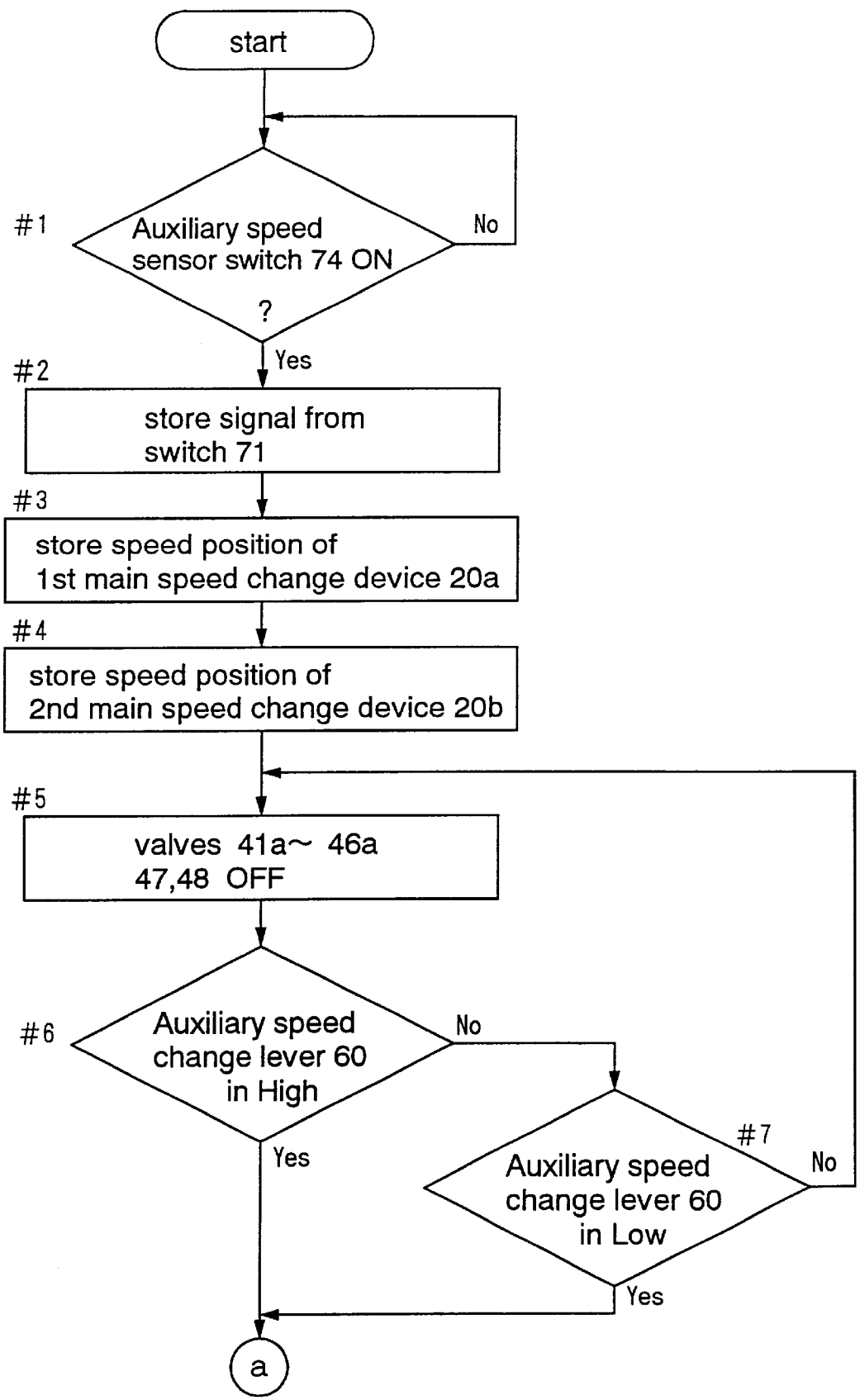
FIG. 6 is a flow chart of a shift control sequence.
Figure 7:
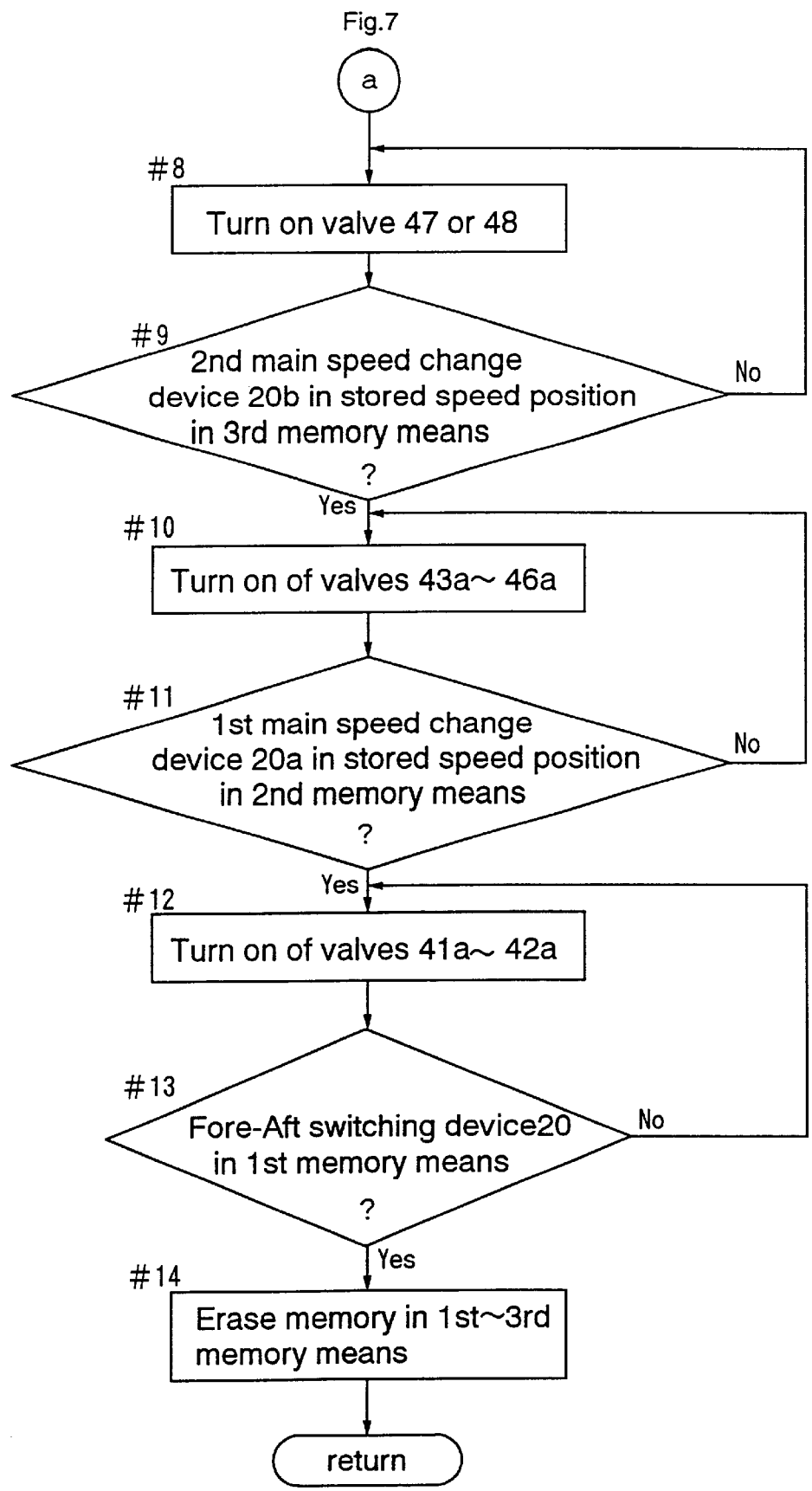
FIG. 7 is a flow chart of the shift control sequence.

In performing an auxiliary change speed operation, the controller 69 operates as shown in FIGS. 6 and 7. When the auxiliary change speed detection switch 74 detects an operation as shown at steps #1–#5, a result of detection by the backward and forward drive detection switch 71 is stored in a first storage 69a which is part of a memory of the controller 69. At this time, the controller 69 determines, based on information from one of the pressure sensors 73, which of the first to eighth speeds is provided by the first main change speed device 20a, and stores this speed information in a second storage 69b which also is part of the memory of the controller 69. Further, the controller 69 determines, based on information from one of the pressure sensors 73, whether the second main change speed device 20b is providing low speed or high speed, and stores this speed information in a third storage 69c which also is part of the memory of the controller 69. Then, the controller 69 operates all of the electromagnetic control valves 41a–46a and electromagnetic control valves 46 and 47 to the clutch disengaging positions. Subsequently, as shown at steps #6–#8, the controller 69 determines, from information received from the potentiometer 70, whether the auxiliary shift lever 60 is operated to the high-speed position H or low-speed position L. When the shift lever 60 is operated to the high-speed position H or low-speed position L, the controller 69 operates the control valve 47 or 48 to the clutch engaging position for causing the second main change speed device 20b to provide the speed stored in the third storage 69c. Subsequently, as shown at steps #9 and #10, when the second main change speed device 20b has returned to the high speed or low speed state provided before the auxiliary change speed operation, the controller 69 operates the control valves 21a–24a to the clutch engaging positions for causing the first main change speed device 20a to provide the speed stored in the second storage 69b. Subsequently, as shown at steps #11 and #12, when the first main change speed device 20a has returned to one of the first to fourth speeds provided before the auxiliary change speed operation, the controller 69 operates the control valve 41a or 42a to the clutch engaging position for causing the backward and forward drive switching device 10 to assume the driving state stored in the first storage 69a. Subsequently, as shown at steps #13 and #14, when the backward and forward drive switching device 10 has returned to the state of forward drive or backward drive provided before the auxiliary change speed operation, the speed and driving state information is deleted from the first to third storages 69a–69c.

The storages 69a–69c are reset for storing speed and driving state information in time of a next auxiliary change speed operation.

Thus, steps #1–#12 constitute a associating means 69e. In response to a shifting operation of auxiliary change speed device 30, this associating means 69e automatically operates the backward and forward drive switching device 10 acting as a propelling clutch, and the clutches 21–26 of the main change speed device 20, as follows.

When a shifting operation is carried out, in which the auxiliary shift lever 60 slides the shift gear 30a to switch the auxiliary change speed device 30 from the high-speed position to the low-speed position or vice versa, both the forward drive clutch 11 and backward drive clutch 12 of backward and forward drive switching device 10 are disengaged automatically, and so are all of the clutches 21–26 of the main change speed device 20. In this way, the backward and forward drive switching device 10 and the first main change speed device 20a and second main change speed device 20b of main change speed device 20 are switched to neutral to stop transmission of the engine output to the auxiliary change speed device 30. As the shift gear 30a is operated to the high-speed position or low-speed position to switch the auxiliary change speed device 30 to the state of high-speed drive or low-speed drive, the backward and forward drive switching device 10 automatically returns to the same forward or backward driving state as before the auxiliary change speed operation. Similarly, the first main change speed device 20a of main change speed device 20 automatically returns to one of the first to fourth speeds provided before the auxiliary change speed operation. The second main change speed device 20b of main change speed device 20 automatically returns to the same lowspeed state or high-speed state as before the auxiliary change speed operation. The pertinent clutches are engaged again for the backward and forward drive switching device 10 and main change speed device 20 to transmit the engine output to the auxiliary change speed device 30. In performing this return operation, the second main change speed device 20b of main change speed device 20 is returned to the transmitting state first, and then the first main change speed device 20a is returned to the transmitting state. After the main change speed device 20 is returned to the transmitting state, the backward and forward drive switching device 10 is returned to the transmitting state.

Thus, in controlling running of the vehicle body, a main shifting operation is carried out by pressing the shift-up switch 61 or shift-down switch 62, and an auxiliary change speed operation by operating the auxiliary shift lever 60. A backward and forward drive switching is effected by operating the backward and forward lever 63.

Specifically, when the shift-up switch 61 is pressed, this switch 61 outputs a shift-up instruction only once. Based on the instruction from the switch 61 and a speed currently provided by the main change speed device 20, the shift control device 69d sets, as a target speed, the speed one stage higher than the speed currently provided, and engages the appropriate clutches among the first to fourth clutches 21–24, low-speed clutch 25 and high-speed clutch 26 by driving the hydraulic pistons 21a–26a thereof to realize the target speed. As a result, the main change speed device 20 is shifted to one of the first to eighth speeds which is one stage higher than the speed provided before the shifting operation. When the shift-down switch 62 is pressed, this switch 62 outputs a shift-down instruction only once. Based on the instruction from the switch 62 and a speed currently provided by the main change speed device 20, the shift control device 69d sets, as a target speed, the speed one stage lower than the speed currently provided, and engages the appropriate clutches among the first to fourth clutches 21–24, low-speed clutch 25 and high-speed clutch 26 by driving the hydraulic pistons 21a–26a thereof to realize the target speed. As a result, the main change speed device 20 is shifted to one of the first to eighth speeds which is one stage lower than the speed provided before the shifting operation.

The auxiliary shift lever 60 is operated while pressing the unlock button 65 to release the lock pin 66.

When the auxiliary shift lever 60 is operated to the high-speed position H, the operating force of this lever moves the shift gear 30a to the high-speed position, thereby placing the auxiliary change speed device 30 in the high-speed state to output the torque from the second main change speed device 20b without changing its rotating speed. When the auxiliary shift lever 60 is operated to the low-speed position L, the operating force of this lever moves the shift gear 30a to the low-speed position, thereby placing the auxiliary change speed device 30 in the low-speed state to output the torque from the second main change speed device 20b in deceleration.

During the auxiliary change speed operation to slide the shift gear 30a, the associating means 69e automatically operates, based on information from the auxiliary change speed operation detection switch 74, to switch to neutral the backward and forward drive switching device 10, and both the first main change speed device 20a and second main change speed device 20b of main change speed device 20. Thus, the shift gear 30a may be slid while stopping power transmission to the auxiliary change speed device 30 to suppress gear meshing noise. When the shifting operation has been completed with the shift gear 30a placed in the high-speed position or low-speed position, the associating means 69e automatically operates, based on information from the potentiometer 70, to return the second main change speed device 20b of main change speed device 20 to the same transmitting state as before the shifting operation, then to return the first main change speed device 20a to the same transmitting state as before the shifting operation, and to return the backward and forward drive switching device 10 to the same transmitting state as before the shifting operation. In this way, the front and rear wheels 1 and 2 are interlocked to the engine 8 with little or no shock applied to the engine 8.

When the auxiliary shift lever 60 is operated to the neutral position N, the shift gear 30a is moved to the neutral position. As a result, the auxiliary change speed device 30 is placed in neutral not to transmit torque from the second main change speed device 20b to the rear differential mechanism 2a or to the front wheel change speed device 33.

When the auxiliary shift lever 60 has been operated to the high-speed position H, neutral position N or low-speed position L, the driver releases the unlock button 65. Then, the lock pin 66 enters a pin hole of positioning piece 67 to lock the auxiliary shift lever 60 to the control position H, N or L.

When the backward and forward lever 63 is rocked forwardly of the vehicle body to the forward drive position F, the controller 69, based on information from the detection switch 71, drives the hydraulic piston 11a of forward drive clutch 11 to engage this clutch 11. As a result, the backward and forward drive switching device 10 is placed in the forward drive state to transmit the torque from the engine 8 to the main change speed device 20 as a forward driving force.

When the backward and forward lever 63 is rocked rearwardly of the vehicle body to the backward drive position R, the controller 69, based on information from the detection switch 71, drives the hydraulic piston 11a of backward drive clutch 12 to engage this clutch 12. As a result, the backward and forward drive switching device 10 is placed in the backward drive state to transmit the torque from the engine 8 to the main change speed device 20 as a backward driving force.

Figure 8:
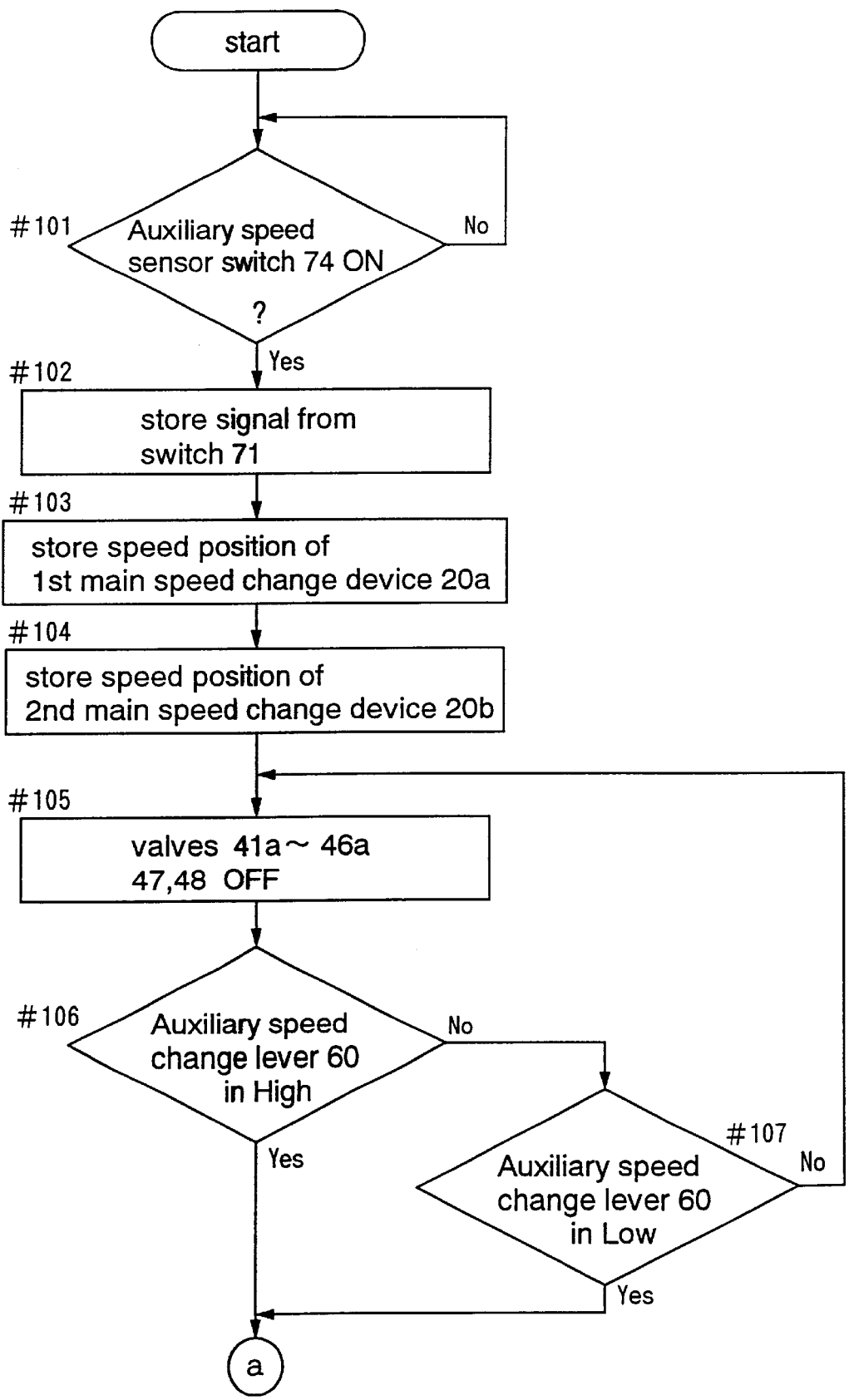
FIG. 8 is a flow chart of a shift control sequence by a shift control apparatus in a different embodiment.
Figure 9:
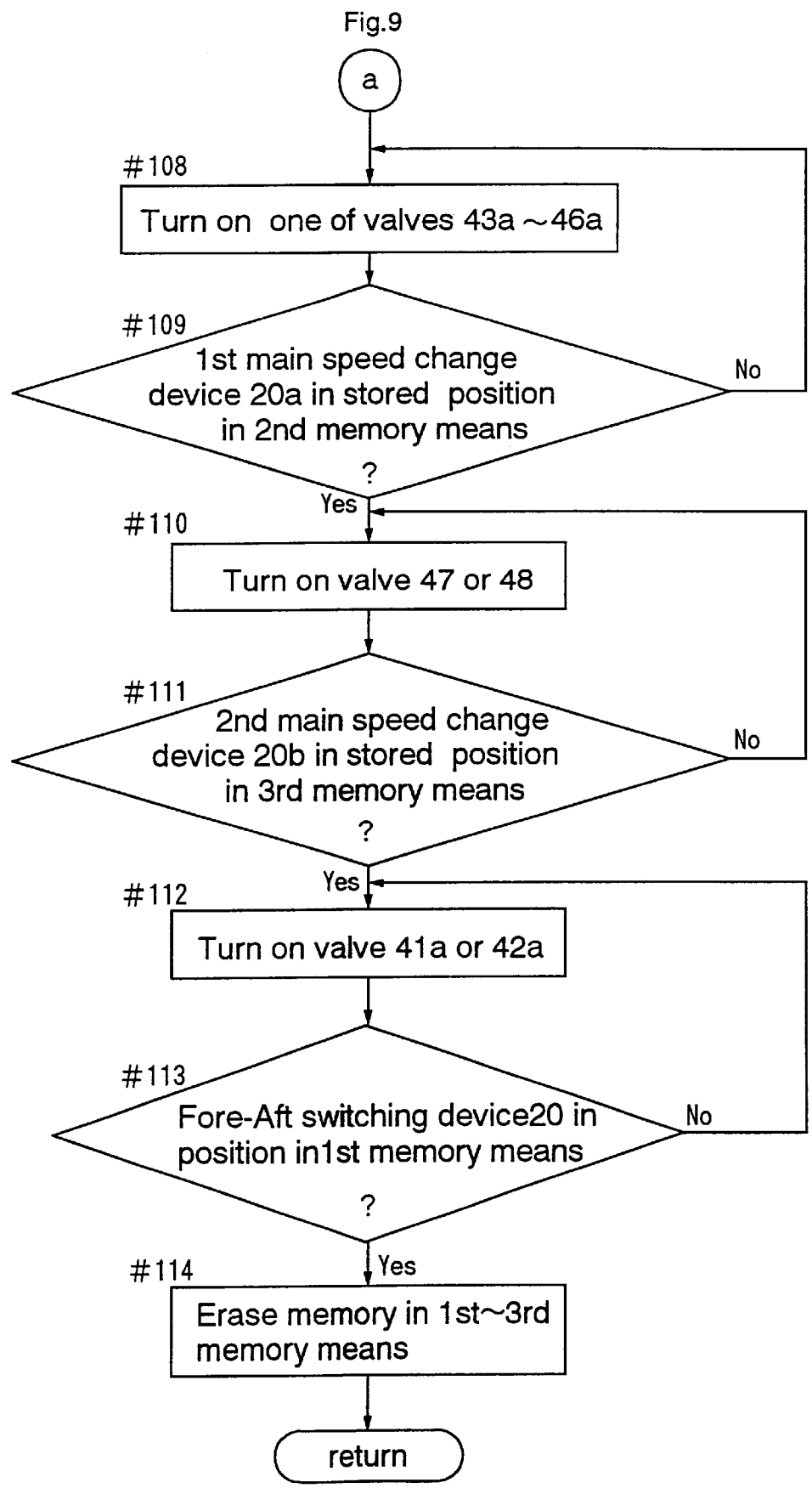
FIG. 9 is a flow chart of the shift control sequence by the shift control apparatus in the different embodiment.

FIGS. 8 and 9 show a shift control by a shift controlling structure in a different embodiment. When an auxiliary change speed operation is performed, the controller 69 in this shift controlling structure operates as described hereinafter.

When the auxiliary change speed detection switch 74 detects an operation as shown at steps #101–#105, a result of detection by the backward and forward drive detection switch 71 is stored in the first storage 69a which is part of the memory of the controller 69. At this time, the controller 69 determines, based on information from one of the pressure sensors 73, which of the first to eighth speeds is provided by the first main change speed device 20a, and stores this speed information in the second storage 69b which also is part of the memory of the controller 69. Further, the controller 69 determines, based on information from one of the pressure sensors 73, whether the second main change speed device 20b is providing low speed or high speed, and stores this speed information in the third storage 69c which also is part of the memory of the controller 69. Then, the controller 69 operates all of the electromagnetic control valves 41a–46a and electromagnetic control valves 46 and 47 to the clutch disengaging positions. Subsequently, as shown at steps #106–#108, the controller 69 determines, from information received from the potentiometer 70, whether the auxiliary shift lever 60 is operated to the high-speed position H or low-speed position L. When the shift lever 60 is operated to the high-speed position H or low-speed position L, the controller 69 operates the electromagnetic control valves 43a–46a to the clutch engaging positions for causing the first main change speed device 20a to provide the speed stored in the second storage 69b. Subsequently, as shown at steps #109 and #110, when the first main change speed device 20a has returned to one of the first to fourth speeds provided before the auxiliary change speed operation, the controller 69 operates the control valve 47 or 48 to the clutch engaging position for causing the second main change speed device 20b to provide the speed stored in the third storage 69c. Subsequently, as shown at steps #111 and #112, when the second main change speed device 20b has returned to the high speed or low speed state provided before the auxiliary change speed operation, the controller 69 operates the control valve 41a or 42a to the clutch engaging position for causing the backward and forward drive switching device 10 to assume the driving state stored in the first storage 69a. Subsequently, as shown at steps #113 and #114, when the backward and forward drive switching device 10 has returned to the state of forward drive or backward drive provided before the auxiliary change speed operation, the speed and driving state information is deleted from the first to third storages 69a–69c. The storages 69a–69c are reset for storing speed and driving state information in time of a next auxiliary change speed operation.

Thus, steps #101–#112 constitute associating means 69e. In response to a shifting operation of auxiliary change speed device 30, this associating means 69e automatically operates the backward and forward drive switching device 10 acting as a propelling clutch, and the clutches 21–26 of the main change speed device 20, as follows.

When a shifting operation is carried out, in which the auxiliary shift lever 60 slides the shift gear 30a to switch the auxiliary change speed device 30 from the high-speed position to the low-speed position or vice versa, both the forward drive clutch 11 and backward drive clutch 12 of backward and forward drive switching device 10 are disengaged automatically, and so are all of the clutches 21–26 of the main change speed device 20. In this way, the backward and forward drive switching device 10 and the first main change speed device 20a and second main change speed device 20b of main change speed device 20 are switched to neutral to stop transmission of the engine output to the auxiliary change speed device 30. As the shift gear 30a is operated to the high-speed position or low-speed position to switch the auxiliary change speed device 30 to the state of high-speed drive or low-speed drive, the backward and forward drive switching device 10 automatically returns to the same forward or backward driving state as before the auxiliary change speed operation. Similarly, the first main change speed device 20a of main change speed device 20 automatically returns to one of the first to fourth speeds provided before the auxiliary change speed operation. The second main change speed device 20b of main change speed device 20 automatically returns to the same low-speed state or high-speed state as before the auxiliary change speed operation. The pertinent clutches are engaged again for the backward and forward drive switching device 10 and main change speed device 20 to transmit the engine output to the auxiliary change speed device 30. In performing this return operation, the first main change speed device 20a of main change speed device 20 is returned to the transmitting state first, and then the second main change speed device 20b is returned to the transmitting state. After the main change speed device 20 is returned to the transmitting state, the backward and forward drive switching device 10 is returned to the transmitting state.

Figure 10:
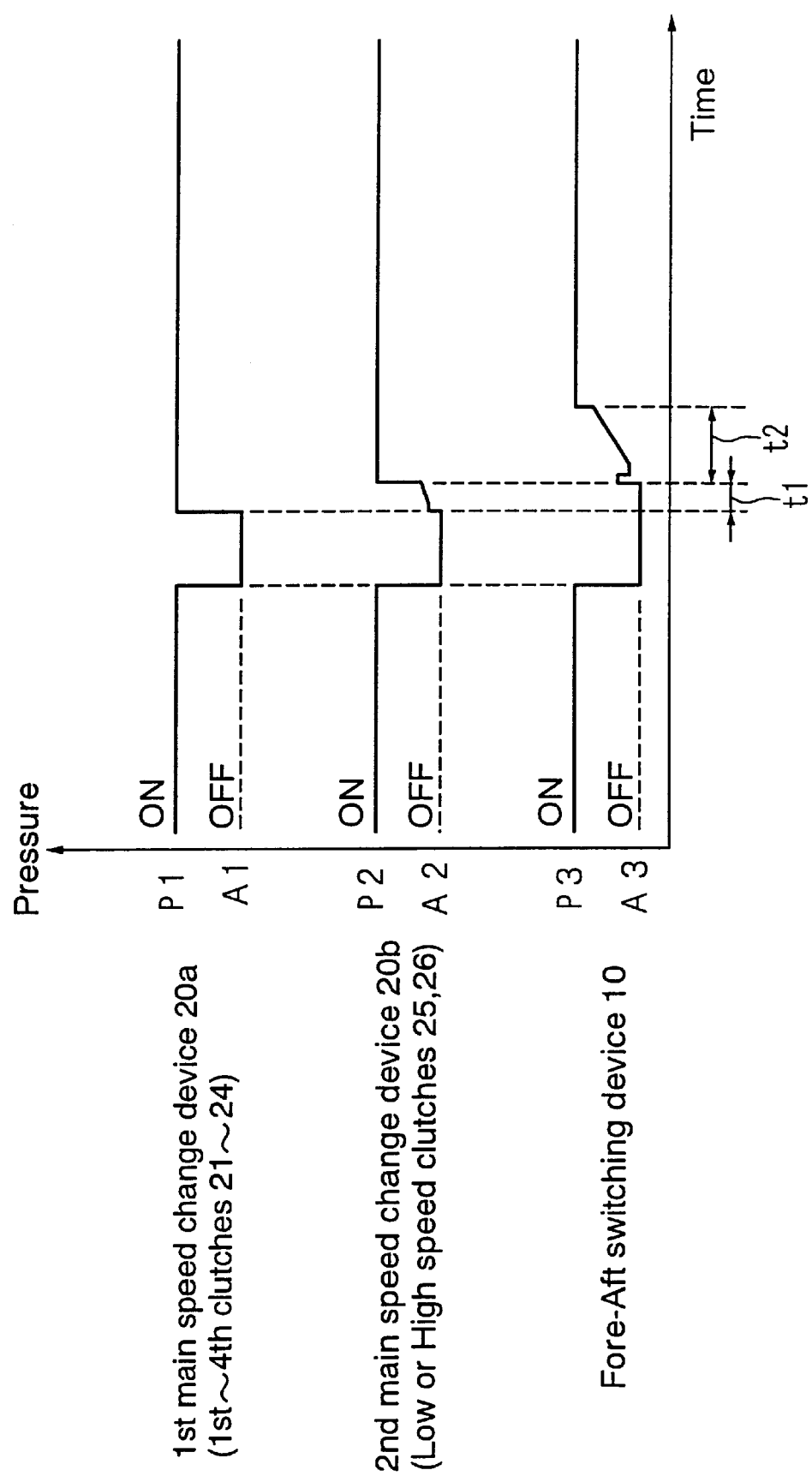
FIG. 10 is an explanatory view of clutch pressures caused by the shift control apparatus in the different embodiment.

When returning the first main change speed device 20a, second main change speed device 20b and backward and forward drive switching device 10 to the transmitting state after the auxiliary change speed device 30 is switched, the controller 69 in this shift controlling structure controls the pressures of the clutches 21–26 of main change speed device 20, and the clutches 11 and 12 of backward and forward drive switching device 10 as shown in FIG. 10.

In FIG. 10, the vertical axis represents working pressures of the clutches 11, 12 and 21–26, while the horizontal axis represents time for switching the clutch pressures. The clutches 21–24 of the first main change speed device 20a are controlled to increase from a disengaging pressure A1 for change speed straight to an engaging pressure P1 for power transmission. The clutches 25 and 26 of the second main change speed device 20b are controlled to increase gradually from a disengaging pressure A2 for change speed to an engaging pressure P2 for power transmission, consuming a pressure increasing time t1, to return from the disengaged state to the engaged state more slowly than the clutches 21–24 of the first main change speed device 20a. The clutches 11 and 12 of backward and forward drive switching devices 10 are controlled to increase gradually from a disengaging pressure A3 for change speed to an engaging pressure P3 for power transmission, consuming a pressure increasing time t2 longer than the pressure increasing time t1, to return from the disengaged state to the engaged state still more slowly than the clutches 21–24 of the first main change speed device 20a.

A further embodiment will be described next with reference to FIGS. 11, 12, and 13. In the following description, like reference numerals are used to identify like parts in the preceding embodiments.

The controller 69 in this embodiment operates as follows.

When a shifting operation is carried out, in which the auxiliary shift lever 60 slides the shift gear 30a to switch the auxiliary change speed device 30 from the high-speed position to the low-speed position or vice versa, both the forward drive clutch 11 and backward drive clutch 12 of backward and forward drive switching device 10 are disengaged automatically, and so are all of the clutches 21–26 of the main change speed device 20. In this way, the backward and forward drive switching device 10 and the first main change speed device 20a and second main change speed device 20b of main change speed device 20 are switched to neutral to stop transmission of the engine output to the auxiliary change speed device 30. As the shift gear 30a is operated to the high-speed position or low-speed position to switch the auxiliary change speed device 30 to the state of high-speed drive or low-speed drive, the backward and forward drive switching device 10 automatically returns to the same forward or backward driving state as before the auxiliary shifting operation. Similarly, the first main change speed device 20a of main change speed device 20 automatically returns to one of the first to fourth speeds provided before the auxiliary shifting operation. The second main change speed device 20b of main change speed device 20 automatically returns to the same low-speed state or high-speed state as before the auxiliary shifting operation. The pertinent clutches are engaged again for the backward and forward drive switching device 10 and main change speed device 20 to transmit the engine output to the auxiliary change speed device 30.

When the backward and forward lever 63 is operated, the shift control device 69d operates based on information from the detection switch 71 and pressure sensors 73 as follows.

When the backward and forward lever 63 is operated to the forward drive position F, a control current is applied to the electromagnetic control valve 41a to switch the backward and forward drive switching device 10 to the forward drive state, and the forward lamp 64b on the display 64 is lit. When the backward and forward lever 63 is operated to the backward drive position R, a control current is applied to the electromagnetic control valve 42a to switch the backward and forward drive switching device 10 to the backward drive state, the backward lamp 64c on the display 64 is lit, and the buzzer 72 is driven intermittently to give a warning. When the backward and forward lever 63 is operated to the neutral position N, the current application to the electromagnetic control valve 41a or 42a is stopped to switch the backward and forward drive switching device 10 to the neutral state, and the neutral lamp 64d on the display 64 is lit.

Figure 11:
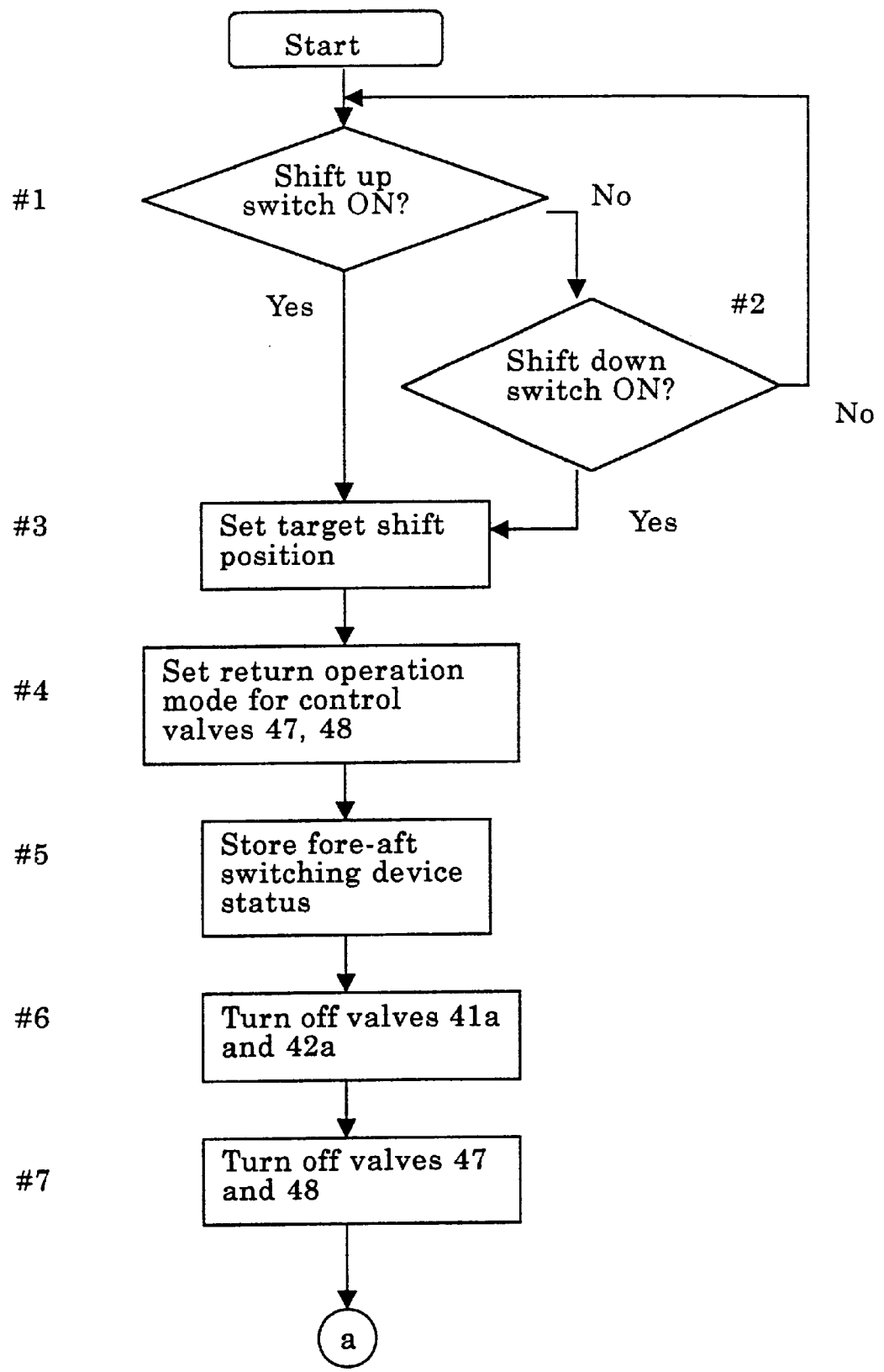
FIG. 11 is a flow chart of a shift control sequence by a shift control apparatus in a further embodiment.
Figure 12:
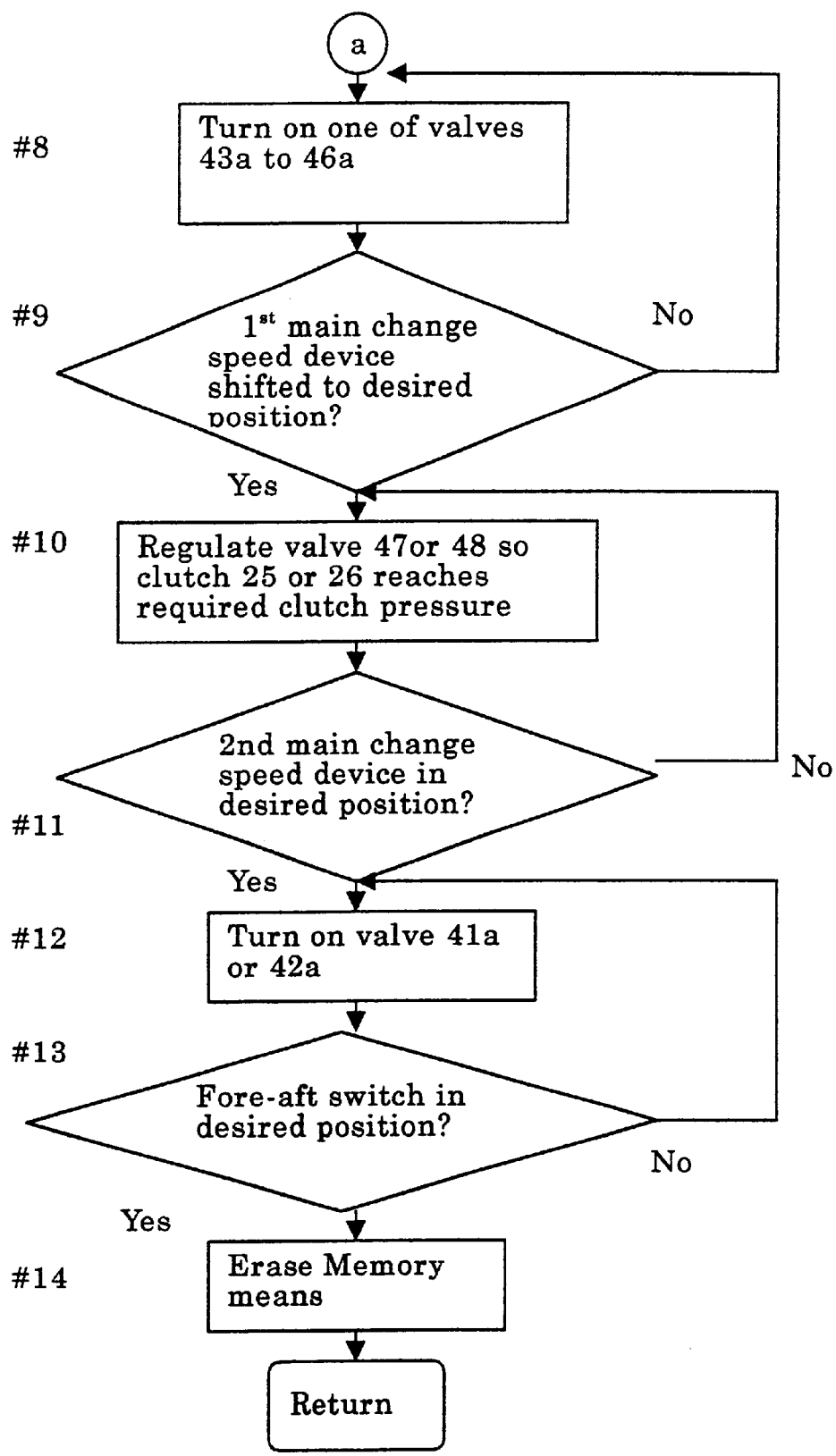
FIG. 12 is a flow chart of the shift control sequence by the shift control apparatus in the further embodiment.

When the shift-up switch 61 or shift-down switch 62 is operated and only if the backward and forward lever 63 is in the forward position F or backward position R then, the controller 69 operates as shown in FIGS. 11 and 12.

When the shift-up switch 61 or shift-down switch 62 is pressed, as shown at steps #1–#3, the controller 69 sets a target speed for switching the main change speed device 20 based on a speed currently provided by the main change speed device 20 and a shifting instruction from the switch 61 or 62. When the shift-up switch 61 is pressed, the target speed is one stage higher than the speed provided by the main change speed device 20 before a shifting operation to be made. When the shift-down switch 62 is pressed, the target speed is one stage lower than the speed provided by the main change speed device 20 before a shifting operation to be made.

Next, as shown at step #4, the controller 69 determines which of the first to fourth clutches 21–24 of the first main change speed device 20a should be engaged to realize the target speed. Based on the result of this determination, the controller 69 sets a return operating mode for returning the control valve 47 or 48 to the engaging position to engage the low-speed clutch 25 or high-speed clutch 26. As shown at step #5, the controller 69 detects, based on information from the pressure sensors 73, whether the backward and forward drive switching device 10 was in the forward drive state or backward drive state when the shifting instruction was outputted, and stores a result of detection in a storage which is part of the memory of controller 69.

Next, as shown at steps #6–#8, appropriate control valves among the electromagnetic control valves 43a–46a are operated to the clutch engaging positions while operating the electromagnetic control valves 41a and 42a to the clutch disengaging positions to disengage the backward and forward drive switching device 10, and while operating the control valves 47 and 48 to the clutch disengaging positions to place the second main change speed device 20b in neutral.

As shown at steps #9 and #10, the controller 69 determines, based on information from the pressure sensors 73, whether the first main change speed device 20a has switched to the state for providing the target speed or not. When the first main change speed device 20a is found to have switched to that state, the control valve 47 or 48 is operated to the clutch engaging position in the operating mode set beforehand, so that the low-speed clutch 25 or high-speed clutch 26 is gradually brought to the clutch pressure for power transmission.

Next, as shown at steps #11 and #12, the controller 69 determines, based on information from the pressure sensors 73, whether the second main change speed device 20b has switched to the state for providing the target speed or not. When the second main change speed device 20b is found to have switched to that state, the electromagnetic control valve 41a or 42a is operated to the clutch engaging position to place the backward and forward drive switching device 10 was in the drive state stored in the storage.

As shown at steps #13 and #14, the controller 69 determines, based on information from the pressure sensors 73, whether the backward and forward drive switching device 10 has returned to the above drive state or not. When the drive switching device 10 is found to have returned to that drive state, the information stored in the storage is deleted therefrom, and the storage is reset for storing driving state information when the shift-up switch 61 or shift-down switch 62 is operated next.

The controller 69 sets the return operating mode for returning the clutches 25 and 26 to the engaged state as follows.

Figure 13:
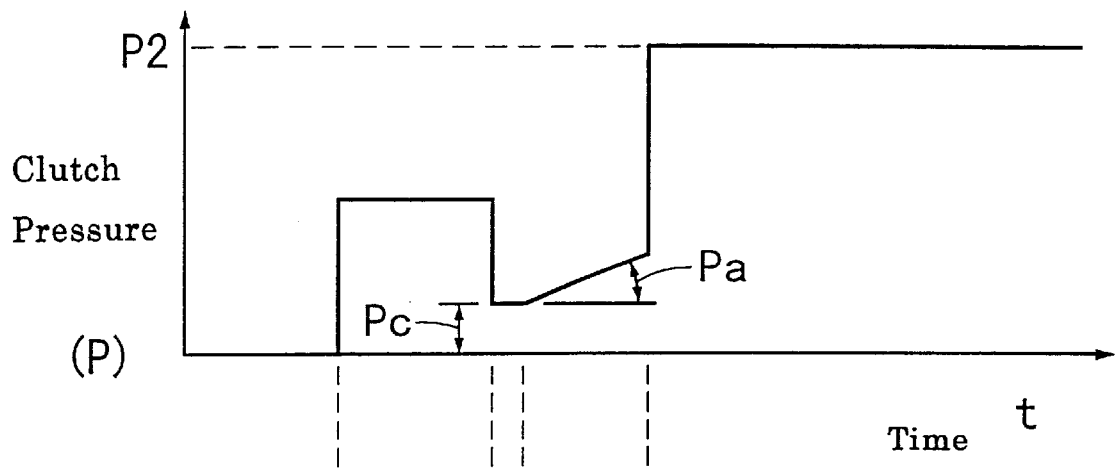
FIGS. 13A and 13B are explanatory views of clutch pressures and solenoid currents caused by the shift control apparatus in the further embodiment.
Figure 13:
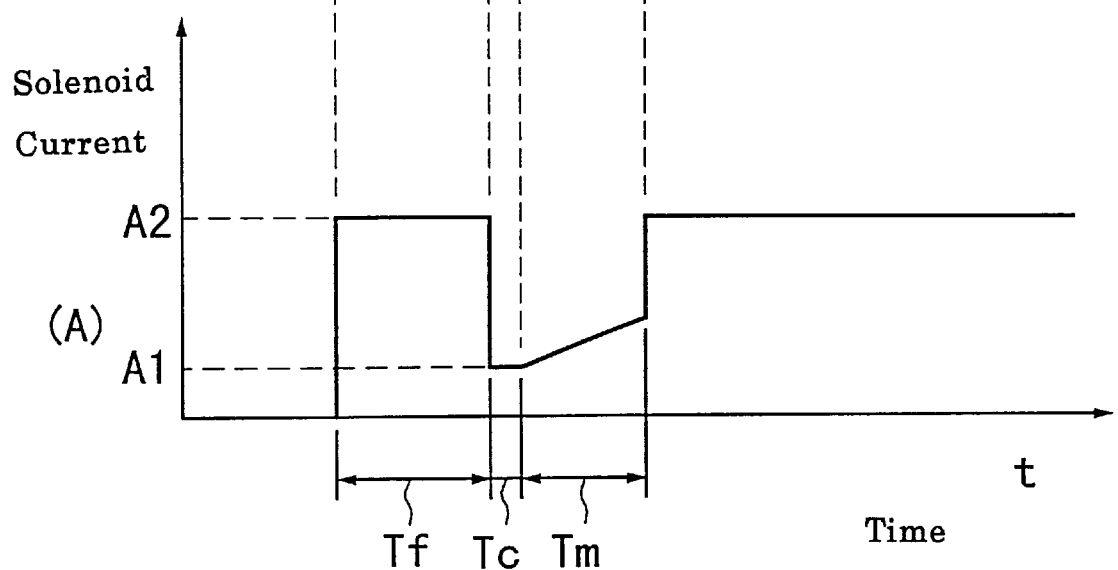

In FIG. 13 (B), the vertical axis represents current value A of the control current applied to solenoids of the control valves 47 and 48, while the horizontal axis represents operating time t. In FIG. 13 (A), the vertical axis represents clutch pressure P of clutches 25 and 26, while the horizontal axis represents operating time t. A control current having a current value A2 is applied to start operating the control valve 47 or 48 to the clutch engaging position. When oil filing time Tf elapses from the start of operation, the current value A2 of the control current is changed to a lower current value A1. This current value A1 is maintained to maintain a minimum clutch pressure Pc. When a fixed time Tc elapses from the change to current value A1, the current value is gradually increased to increase the clutch pressure gradually with a modulate pressure gradient Pa. Upon lapse of a modulate time Tm, the current value is raised to the same operation starting current value A2 to provide a transmitting clutch pressure P2. The oil filling time Tf, fixed time Tc, modulate time Tm, modulate pressure gradient Pa and minimum pressure Pc may be adjusted to vary the time of slippage occurring when the clutches 25 and 26 return from disengagement to engagement, and to vary the clutch pressure in the slipping state. The return operating mode may be adjusted to the clutches 21–24 such that, even if a different clutch of the first main change speed device 20a is engaged when the clutch 25 or 26 returns to the engaged state to return the second main change speed device 20b from disengagement to engagement, the front and rear wheels 1 and 2 are gradually connected, while in synchronous rotation, with a minimum shock of connection applied to the components of the first main change speed device 20a.

That is, a return operating mode for returning the clutch 25 or 26 to the engaged state to return the second main change speed device 20b from the neutral position to a transmitting state after the first main change speed device 20a is changed to a speed stage determined by the target speed, may be set in advance to suit each of the four clutches 21–24 of the first main change speed device 20a. A return operating mode corresponding to one of the clutches 21–24 of the first main change speed device 20a engaged at step #8 is selected when shifting the second main change speed device 20b at step #10. The clutch 25 or 26 is engaged in this return operating mode.

Thus, steps #4–#12 constitute associating means 69e. In response to a shifting operation of the first main change speed device 20a, this associating means 69e automatically switches the backward and forward drive switching device 10 acting as a propelling clutch, and the second main change speed device 20b, as follows.

When the shift-up switch 61 or shift-down switch 62 is pressed to effect a shifting operation to switch the clutches 21–24 in order for the first main change speed device 20a to switch the main change speed device 20 to a target speed stage, the forward drive clutch 11 and backward drive clutch 12 of backward and forward drive switching device 10 are automatically disengaged, and so are the low-speed clutch 25 and high-speed clutch 26 of second main change speed device 20b. Consequently, the backward and forward drive switching device 10 and second main change speed device 20b are both switched to the neutral state to stop torque transmission from the engine and the front and rear wheels 1 and 2 to the first main change speed device 20a. When the shifting operation of the first main change speed device 20a is completed with one of the clutches 21–24 of the first main change speed device 20a engaged, appropriate clutches of the backward and forward drive switching device 10 and second main change speed device 20b are returned to the engaged state. As a result, the backward and forward drive switching device 10 is returned to the same forward drive or backward drive state as before the shifting operation, and the second main change speed device 20b is placed in the low-speed or high-speed transmitting state determined by the target speed, to drive the front and rear wheels 1 and 2. In performing this return operation, the second main change speed device 20b is returned to the transmitting state, and then the backward and forward drive switching device 10 is returned to the transmitting state. Further, a return operating mode corresponding to one of the clutch 21–26 of the main change speed device 20a engaged is selected. In this return operating mode, the clutch 25 or 26 of the second main change speed devices 20b is returned gradually to the transmitting clutch pressure.

In each of the shift-up and shift-down operations, the associating means 69e executes shifting of the first main change speed device 20a while placing the backward and forward drive switching device 10 and second main change speed device 20b in neutral. When the first main change speed device 20a has been shifted, the second main change speed devices 20b is placed in the low-speed or high-speed transmitting state by gradually raising the clutch 25 or 26 to the transmitting clutch pressure. After the second main change speed device 20b is placed in the transmitting state, the backward and forward drive switching device 10 is placed in the same forward or backward drive state as before the shifting operation. Thus, the shifting operation is carried out in a way to produce little or no shock.

What is claimed is:

1. A working vehicle comprising:
   an engine;
   a propelling clutch driven by said engine;
   a first change speed unit driven by said propelling clutch and shiftable to a plurality of speed stages and to neutral by switching of a plurality of change speed clutches;
   a second change speed unit driven by said first change speed unit and shiftable between a transmitting position and a neutral position;
   traveling means driven by drive transmitted from said second change speed unit; and
   associating means for automatically switching said propelling clutch and said change speed clutches in response to a shifting operation of one of said first and second change speed units such that, when said one of said first and second change speed units is shifted, said propelling clutch is disengaged and the other of said first and second change speed units is switched to neutral, and when said one of said first and second change speed units is switched to a transmitting state, said propelling clutch is engaged and the other of said first and second change speed unit is returned to a transmitting state;
   wherein said associating means is operable to return said other of said first and second change speed units to the transmitting state, and then to engage said propelling clutch.

2. A working vehicle as defined in claim 1, wherein said first change speed unit includes first main change speed means for receiving torque output of said propelling clutch, and second main change speed means for receiving torque output of said first main change speed means, said associating means being operable to return said first main change speed means to a transmitting state, and then to return said second main change speed means to a transmitting state.

3. A working vehicle as defined in claim 1, wherein said first change speed unit includes first main change speed means for receiving torque output of said propelling clutch, and second main change speed means for receiving torque output of said first main change speed means, said associating means being operable to return said second main change speed means to a transmitting state, and then to return said first main change speed means to a transmitting state.

4. A working vehicle as defined in claim 1, wherein said propelling clutch comprises backward and forward drive switch means switchable to a forward drive state, a backward drive state and a neutral state by switching of a forward drive clutch and a backward drive clutch.

5. A working vehicle as defined in claim 1, wherein said first change speed unit includes first main change speed means for receiving torque output of said propelling clutch, and second main change speed means for receiving torque output of said first main change speed means.

6. A working vehicle as defined in claim 1, wherein said associating means utilizes different return control modes for returning said second change speed unit to the engaging state depending on a target change speed position for said first change speed unit.

7. The working vehicle of claim 1, further including storage means for storing speed and driving information during each said shifting operation.

8. A working vehicle, comprising:
   an engine;
   a propelling clutch driven by said engine;
   a first change speed unit driven by said propelling clutch and shiftable to the plurality of speed stages and to neutral by switching of a plurality of change speed clutches;
   a second change speed unit driven by said first change speed unit and shiftable between a transmitting position and a neutral position;
   traveling means driven by drive transmitted from said second change speed unit;
   associating means for automatically switching said propelling clutch and said change speed clutches by a plurality of control valves in response to a shifting operation of one of said first and second change speed units such that, when said one of said first and second change speed units is shifted, said propelling clutch is disengaged and the other of said first and second change speed units is switched to neutral, and when said one of said first and second change speed units is switched to a transmitting state, said propelling clutch is engaged and the other of said first and second change speed unit is returned to a transmitting state, wherein said associating means is operable to return said other of said first and second change speed units to the transmitting state, and then to engage said propelling clutch; and
   a storage unit for storing speed and driving information during each said shifting operation, wherein said storage means includes a first storage means for storing information of said propelling clutch and a second storage means for storing information of said first change speed unit.

9. The working vehicle of claim 5, further including storage means for storing speed and driving information during each said shifting operation.

10. A working vehicle, comprising:
    an engine;
    a propelling clutch driven by said engine;
    a first change speed unit driven by said propelling clutch and shiftable to the plurality of speed stages and to neutral by switching of a plurality of change speed clutches;
    a second change speed unit driven by said first change speed unit and shiftable between a transmitting position and a neutral position;
    traveling means driven by drive transmitted from said second change speed unit;

associating means for automatically switching said propelling clutch and said change speed clutches by a plurality of control valves in response to a shifting operation of one of said first and second change speed units such that, when said one of said first and second change speed units is shifted, said propelling clutch is disengaged and the other of said first and second change speed units is switched to neutral, and when said one of said first and second change speed units is switched to a transmitting state, said propelling clutch is engaged and the other of said first and second change speed unit is returned to a transmitting state, wherein said associating means is operable to return said other of said first and second change speed units to the transmitting state, and then to engage said propelling clutch, wherein said first change speed unit includes first main change speed means for receiving the torque output of said propelling clutch, and second main change speed means for receiving torque output of said first main change speed means; and storage means for storing speed and driving information during each of said shifting operation, wherein said storage means includes a first storage means for storing information of said propelling clutch and a second storage means for storing information of said first main change speed means.

11. The working vehicle of claim 10, wherein the storage means further includes a third storage means for storing information of said second main change speed means.

12. A working vehicle comprising:

an engine;

a propelling clutch driven by said engine;

a main change speed device driven by said propelling clutch and shiftable to a plurality of speed stages and to neutral by switching of a plurality of change speed clutches;

an auxiliary change speed device driven by said main change speed device and shiftable between a transmitting position and a neutral position;

traveling means driven by drive transmitted from said auxiliary change speed device;

memory means for storing information concerning a transmitting state of said main change speed device; and associating means for automatically switching said propelling clutch and said main change speed device in response to a shifting operation of said auxiliary change speed device, and wherein said associating means is operable such that,
when said auxiliary change speed device is shifted, said propelling clutch is disengaged, the information concerning the transmitting state of said main change speed device is stored into said memory means and said main change speed device is switched to neutral, and when said auxiliary change speed device is switched to a transmitting state, said main change speed device is switched to a transmitting state based on the information stored in said memory means and subsequently said propelling clutch is engaged.

13. A working vehicle comprising:

an engine;

a propelling clutch driven by said engine;

a first main change speed device driven by said propelling clutch and shiftable to a plurality of speed stages and to neutral by switching of a plurality of change speed clutches;

a second main change speed device driven by said first main change speed device and shiftable between a transmitting position and a neutral position;

traveling means driven by drive transmitted from said second main change speed device;

memory means for storing information concerning a transmitting state of said second main change speed device; and associating means for automatically switching said propelling clutch and said second main change speed device in response to a shifting operation of said first main change speed device, wherein said associating means is operable such that,
when said first main change speed device is shifted, said propelling clutch is disengaged, the information concerning the transmitting state of said second main change speed device is stored into said memory means and said second main change speed device is switched to neutral; and when said first main change speed device is switched to a transmitting state, said second main change speed device is switched to a transmitting state based on the information stored in said memory means and subsequently said propelling clutch is engaged.

14. The working vehicle as defined in claim 1, wherein said associating means is a portion of a microcomputer coupled to pressure sensors and control valves.

15. The working vehicle as defined in claim 8, wherein said associating means is a portion of a microcomputer coupled to pressure sensors and control valves.

16. The working vehicle as defined in claim 10, wherein said associating means is a portion of a microcomputer coupled to pressure sensors and control valves.

17. The working vehicle as defined in claim 12, wherein said associating means is a portion of a microcomputer coupled to pressure sensors and control valves.

18. The working vehicle as defined in claim 13, wherein said associating means is a portion of a microcomputer coupled to pressure sensors and control valves.

19. The working vehicle as defined in claim 1, wherein said associating means is a portion of a controller including a microcomputer linked to pressure sensors for electromagnetic control valves, linked to a display and coupled to the control valves for controlling the operation of said control valve.

20. The working vehicle as defined in claim 12, wherein said associating means is a portion of a controller including a microcomputer linked to pressure sensors for electromagnetic control valves, linked to a display and coupled to the control valves for controlling the operation of said control valve.

* * * * *